Feb. 20, 1934.    C. P. MEBANE    1,948,390
RUBBER SHOE SOLE AND PROCESS OF PRODUCING THE SAME
Filed Oct. 27, 1931
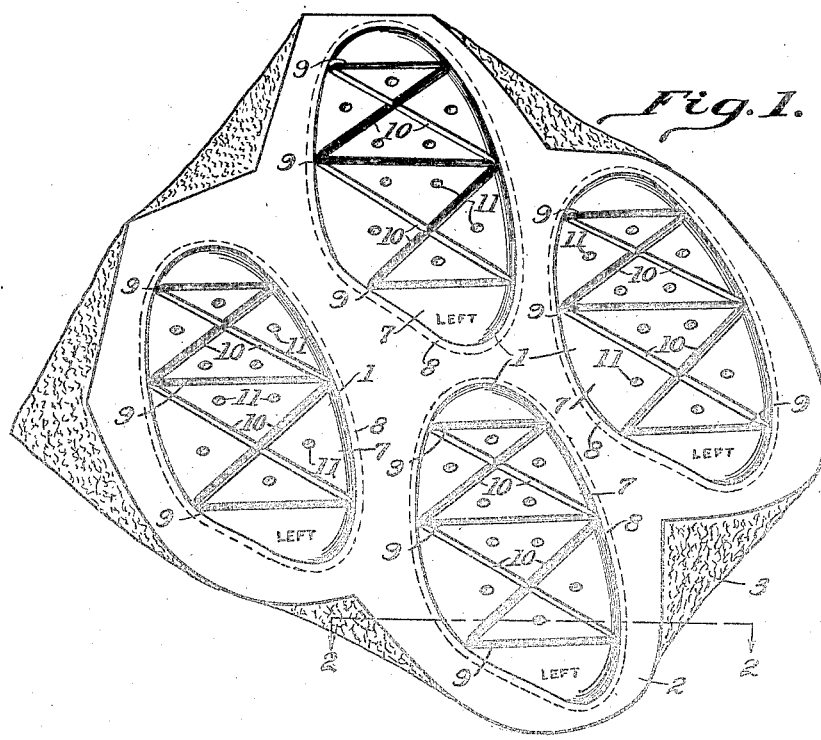
Fig. 1.
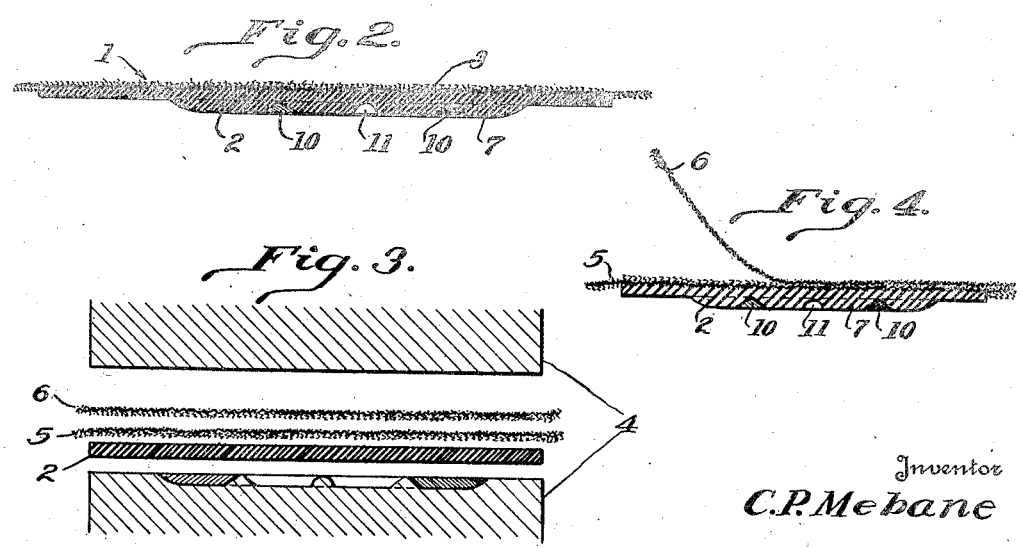
Inventor
C. P. Mebane
By W. S. McDowell
Attorney Patented Feb. 20, 1934

1,948,390

UNITED STATES PATENT OFFICE 1,948,390

RUBBER SHOE SOLE AND PROCESS OF PRODUCING THE SAME

Charles P. Mebane, Columbus, Ohio, assignor to The National Glove Company, Columbus, Ohio, a corporation of Ohio Application October 27, 1931. Serial No. 571,337

5 Claims. (Cl. 36—32)

This invention relates to an improved rubber half sole for shoes and method of producing the same. Rubber half soles of this general character are usually formed to include thin light weight rubber bodies suitably shaped to conform with the general configuration of the forward part of the customary leather shoe sole of a boot or shoe, and are adhesively attached to the lower surface of the shoe sole to become a permanent part of the associated article of footwear, the ground engaging surface of the rubber half sole being ordinarily broken or roughened to provide an antislipping means when the half sole is attached to the under part of a shoe. Rubber half soles of this type may be attached to worn shoe soles as a repair measure or are, quite often, applied to new shoes, since the rubber surface of the half sole is considered by many to improve the walking qualities of shoes over ordinary leather surfaces and to resist wear in the same sense that shoe heels of rubber are considered superior to unyielding leather heels.

In the use of such rubber half soles, considerable difficulty has been encountered in the matter of providing a satisfactory union between the leather soles of the shoe and the vulcanized rubber half soles. Nails or similar mechanical fastening devices of the type used in attaching rubber heels are unsuitable, since the half sole is too thin to admit of their successful employment and such a mechanical connection does not provide for a permanent close engagement between the juxtaposed leather and rubber soles to an extent sufficient to exclude the presence of gaping joints between the adjacent surfaces. Resort has been made, also, in order to overcome this difficulty to suitable cements, adhesives, celluloid and/or raw gum surfaces for the purpose of securely and permanently uniting the rubber half sole member to a leather shoe sole. This has been open to objection that no satisfactory cement is apparently available to directly and securely unite the vulcanized rubber half sole to the leather sole and maintain the security of the union under the difficult conditions imposed by actual wear and service. Further improvements have been made by embedding the upper surface of the half sole, at the time the rubber is being vulcanized in the process of manufacture, in a fabric layer consisting of such materials as cheesecloth, linen or a light grade of canvas. In such a construction, the fabric strip becomes joined with the rubber body of the half sole on the upper or inner surface thereof, and this fabric surface must then be scored or buffed to make the materials rough, whereby the cement securing means may be made more effective in the matter of uniting permanently the leather and rubber soles.

The present invention has to do particularly with improvements in the last described construction and process, and provides for the production of rubber half soles wherein the soles are formed first from vulcanized rubber from which the individual soles are cut in desired form, and wherein each of the rubber soles, during the vulcanizing step, has formed thereon a fleecy napped surface, which is of such a character that without being buffed, it readily functions to receive and unite with a rubber cement, whereby such rubber half soles may be securely united with the use of such an adhesive to the leather soles of ordinary shoes.

In accordance with one of the preferred methods of producing such a rubber half sole having a napped upper surface, the soft rubber, prior to vulcanizing, is placed in a mold or press and has placed thereon a sheet of canton flannel having its soft fleecy nap surface placed downwardly in direct contact with the rubber sheet and pressed into engagement therewith during vulcanization so that the rubber, comprising the sheet, is forced into the fibers of the nap surface and enters or at least partially impregnates the flannel sheeting, with the result that such sheeting becomes inseparably and tenaciously incorporated in connection with the body of the rubber sheet and cannot be torn or forcibly removed therefrom, either through wear or other cause, as is the case when use is made of certain prior methods.

To avoid the necessity for buffing or roughening the fabric coated surface of the rubber sheet and at the same time to provide for a very effective union between the completed rubber half sole and a leather sole by the use of a non-inflammable rubber cement, the present invention further provides for the placing of a second sheeting of canton flannel with its nap surface placed face downwardly on the relatively smooth upper surface of the first layer of flannel sheeting, which is embedded in the rubber sheeting, whereby during vulcanization under pressure, a sufficient amount of rubber is pressed through the fibers of the first sheeting of canton flannel to engage with the soft nap fibers of the second sheeting of flannel so that following such vulcanizing operation, when the pressure is removed, the second sheeting of flannel may be separated from the first flannel sheeting but due to the engagement of a small amount of rubber with the nap of the second sheeting, a portion of such nap is retained in connection with the upper surface of the first-named sheeting, with the result that the upper surface of the completed rubber half sole possesses a soft nap like condition by which a rubber cement, containing a latex base, will tenaciously adhere and at the same time providing for a very secure union between the half sole and the leather shoe sole.

By forming the rubber half soles originally in sheets and then cutting the sheets into the individual soles, and also by eliminating the difficult and costly buffing operation, I am enabled to produce rubber half soles at low manufacturing costs and at the same time soles of light weight, great flexibility and of such form that they may be readily and permanently secured by relatively unskilled persons to the leather soles of ordinary shoes.

This invention is a continuation in part of my prior application, Serial No. 489,378 filed October 17, 1930.

For a further understanding of the invention, reference is to be had to the following description and to the accompanying drawing wherein:

Fig. 1 is a plan view of the rubber sheeting following vulcanization showing the half soles formed in accordance with the present invention and prior to the cutting of the half soles from the sheeting;

Fig. 2 is a vertical transverse sectional view taken through the sheet on the line 2—2 of Fig. 1;

Fig. 3 is a similar view disclosing the vulcanizing press and the several layers of material entering into the formation of the rubber half sole;

Fig. 4 is a similar view disclosing the step of removing the superposed canton flannel layer from the complemental layer embedded in the rubber sheet.

Referring more particularly to the drawing, as shown in Figs. 1 and 2, the numeral 1 designates my improved half sole in its entirety. Each of these half soles includes a body portion 2 formed from a homogeneous vulcanized rubber compound and which is yieldable, pliable and relatively soft to a degree usually obtaining in rubber heel lifts. The upper surfacing portion 3 of the half sole comprises a single layer of fabric and I prefer to employ a cloth fabric having a nap at least on one side and in this connection, I prefer to use canton flannel although, of course, other fabrics having loose pile or nap surfaces of a fleecy soft character may be utilized.

In forming my improved half sole, the rubber compound comprising the body portion 2 is spread upon the lower surface of a vulcanizing press 4 in sheet-like form, and I then take a sheet of canton flannnel and place the same with its single nap-like surface downwardly upon the un-vulcanized rubber in the press, such first sheeting being indicated by the numeral 5. The next step in operation is to take a second sheet of canton flannel, indicated at 6, and place its nap-like surface downwardly upon the relatively smooth upper surface of the first sheet of flannel. Pressure is then applied in the usual manner to the mold and vulcanizing temperatures are attained, whereby the cure of the rubber to the desired degree of stiffness and pliability and impart to the same its desired form for commercial use as a wear-receiving sole for shoes. As stated, during the vulcanizing operation, the rubber and flannel sheets are under pressure. This pressure is of sufficient magnitude to effect the penetration of the rubber into inseparable engagement with the nap-like under surface of the first flannel sheet, indicated at 5. Also, to some extent, the pressure is such as to cause the rubber to penetrate through the fibers of the sheet 5 even though the sheet may not be said to be completely embedded in the rubber body. In any event, a sufficient amount of rubber penetrates through the first layer of flannel to engage with the nap-like surface of the second sheet 6 of flannel so that when the press is open, this second or upper sheet of flannel may, in contrast to the under sheet of flannel, be freely removed from the joined rubber and flannel sheeting, but such removal results in causing at least a portion of such fiber, comprising the nap-like surface of the upper sheet, to be torn free from the upper sheet and becomes a part of the upper surface of the first flannel sheet, whereby the upper surface of the sheet 5 possesses a nap-like surface which need not be buffed or roughened to admit of its being adhesively secured in a firm and positive manner to the under surface of a leather shoe sole. The second sheet 6 of flannel may then be used in the subsequent operation for direct union with the rubber sheeting and these operations repeated indefinitely.

Upon the removal of the joined rubber and fiber material, as a composite sheet, the latter is cut so as to form the individual half soles indicated at 1. These of course will vary in size in accordance with the shoe sizes for which they are to be employed. In securing the completed half soles to a leather sole, I use a rubber base or latex cement, and this cement is spread over the nap-containing upper surface of the rubber half sole and may likewise be applied to the leather sole. The rubber half sole is then positively pressed, usually manually, into engagement with the shoe sole in smooth, unwrinkled application thereon and allowed to stand for the necessary period of time to permit the cement to dry and harden, after which the shoes may be worn. The cement embeds itself in and tenaciously adheres to the fibers or nap formed, as previously described, with the upper surface of the half sole, so that the cement is far more effective in producing a permanent union between the rubber and leather soles than when the customary buffing operations are resorted to. I also find that by using a cement composed mainly of latex or caoutchouc greatly improved adhesion is obtained between the soles over previous sheets heretofore employed in this connection.

The bottom of each rubber half sole may be formed with a tread 7 having a uniform thickness and surrounding the tread is a relatively thin marginal edge 8. In order to impart to the tread portion the same degree of flexibility as obtains in the marginal portion 5, said tread portion is formed to include a plurality of transversely extending, longitudinally spaced, parallel V-shaped grooves 9. Each of the grooves 9 extends the entire width of the tread portion and the bottom of each of the grooves is in substantially the same plane as the lower surface of the marginal edge 8. In order to further increase the flexibility of the sole, intersecting diagonal grooves 10 are provided, each of which extends from one end of a transverse groove to the opposite end of an adjacent transverse groove. Openings or pockets 11 are provided in the body portion to function as vacuum chambers to reduce the possibility of slipping.

In view of the foregoing, it will be seen that my improved half sole has a body portion of relatively soft, pliable, homogeneous, vulcanized rubber compound which is formed, in effect, integral with a fabric surfacing portion. This surfacing portion 3 provides an upper fabric surface containing nap-like fibers which may be firmly united through the use of the cement specified to the leather sole of a shoe. The fabric surface of the half sole having once been cemented to the leather sole provides a union which remains firm under all conditions of service, so that in effect my improved half sole becomes a part of the shoe, permitting the latter to be worn thereafter with ease, security and comfort and resistance to wear. Again, by employing the steps above recited, the rubber half sole may be manufactured at a relatively low cost and, in addition to its simplicity in construction and economy in manufacture, a construction is produced by which superior results are obtainable in the manner of effecting a permanent and enduring connection between rubber and leather soles superior to that heretofore employed. Outing flannel having a nap on both sides may be employed also in forming the half sole in lieu of the double canton flannel sheets and I therefore use the term canton flannel in the description and claims to include any fabric having one or more of its sides provided with a fleece-like nap. Again, I may employ a fabric having a single napped surface but wherein the smoothed or unnapped surface is treated with unvulcanized rubber by a process known to the trade as "frictionizing" fabric and this rubberized surface is then placed face down on the rubber body forming the sole. The customary vulcanizing pressed operation is then carried out to permanently join the fabric to the rubber body, leaving a napped upper surface, which does not require buffing and to which the latex cement is directly applied, as above. This latex cement is well known in the rubber industry and contrary to ordinary solvent cements, contains approximately two or more times the amount of rubber than is customarily used in such solvent cements. This large amount of rubber readily unites with the napped fabric to directly secure the rubber half sole to the leather shoe sole. It will be understood that the rubber half sole formed in accordance with the present invention may be used in connection with any ordinary shoe sole whether leather or other material.

What is claimed is:

1. A half sole for shoes comprising a thin flat body of shoe-sole formation formed from a pliable rubber compound and having inseparably incorporated in the upper surface thereof a layer of canton flannel, the nap surface of said flannel being embedded in the rubber compound, the upper surface of said flannel layer being provided with nap-like fibers.

2. A half sole for shoes comprising a thin flat body of shoe-sole formation formed from a pliable rubber compound and having inseparably incorporated in the upper surface thereof a layer of canton flannel, the nap surface of said flannel being embedded in the rubber compound, the upper surface of said flannel layer being provided with nap-like fibers having union with the rubber compound.

3. A rubber half sole for shoes comprising a relatively thin and flat pliable body formed from a vulcanized rubber compound, and a single layer of fabric having one side thereof provided with a napped surface, said nap surface being directly embedded and vulcanized in connection with the rubber compound comprising said body, whereby said fabric layer is permanently united with the rubber body material, and a nap-like material independent of the nap of the fabric layer applied to the upper surface of said layer and joined with the rubber compound impregnated in said layer.

4. The method of producing rubber half soles which comprises forming a body sheet composed of a vulcanizable rubber compound, applying directly to one surface of this body sheet while the latter is in a soft plastic state a layer of fabric material having on one side a relatively smooth surface and on the other side a soft fleecy fibrous nap surface, said nap surface being directly arranged to engage with the rubber body material, applying a second layer of fabric material having the same properties as said first-named layer with the nap-like surface of the second layer in contact with the smooth surface of the first layer, then applying vulcanizing pressures and temperatures to said materials to cause the first-named fabric layer to become partially impregnated by said rubber compound, whereby to permit the rubber compound to penetrate said first layer sufficiently to partially adhere to the nap of the second fabric layer, removing the pressures and temperatures and separating the second layer of fabric from the first-named layer in such a manner as to permit a portion of the nap of the second named layer of fabric to adhere to the smooth upper surface of said first-named layer of fabric incorporated in the rubber compound.

5. The method of producing rubber half soles which consists of forming a body sheet composed of a vulcanizable rubber compound, applying directly to one surface of this body sheet while the latter is in a soft plastic state a layer of fabric material having on one side a relatively smooth surface and on the other side a soft fleecy fibrous nap surface, said nap surface being directly arranged to engage with the rubber body material, applying a second layer of fabric material having the same properties as said first-named layer with the nap-like surface of the second layer in contact with the smooth surface of the first layer, then applying vulcanizing pressures and temperatures to said materials to cause the first-named fabric layer to become partially impregnated by said rubber compound, whereby to permit the rubber compound to penetrate said first layer sufficiently to partially adhere to the nap of the second fabric layer, removing the pressures and temperatures and separating the second layer of fabric from the first-named layer in such a manner as to permit a portion of the nap of the second named layer of fabric to adhere to the smooth upper surface of said first-named layer of fabric incorporated in the rubber compound and then cutting the sheets of the fabric coating of vulcanized rubber thus formed into the shapes of shoe soles.

CHARLES P. MEBANE.